March 29, 1966   E. J. BETHE   3,243,491
METHODS OF MAKING FOAM PRODUCTS
Filed Oct. 1, 1962   2 Sheets-Sheet 1
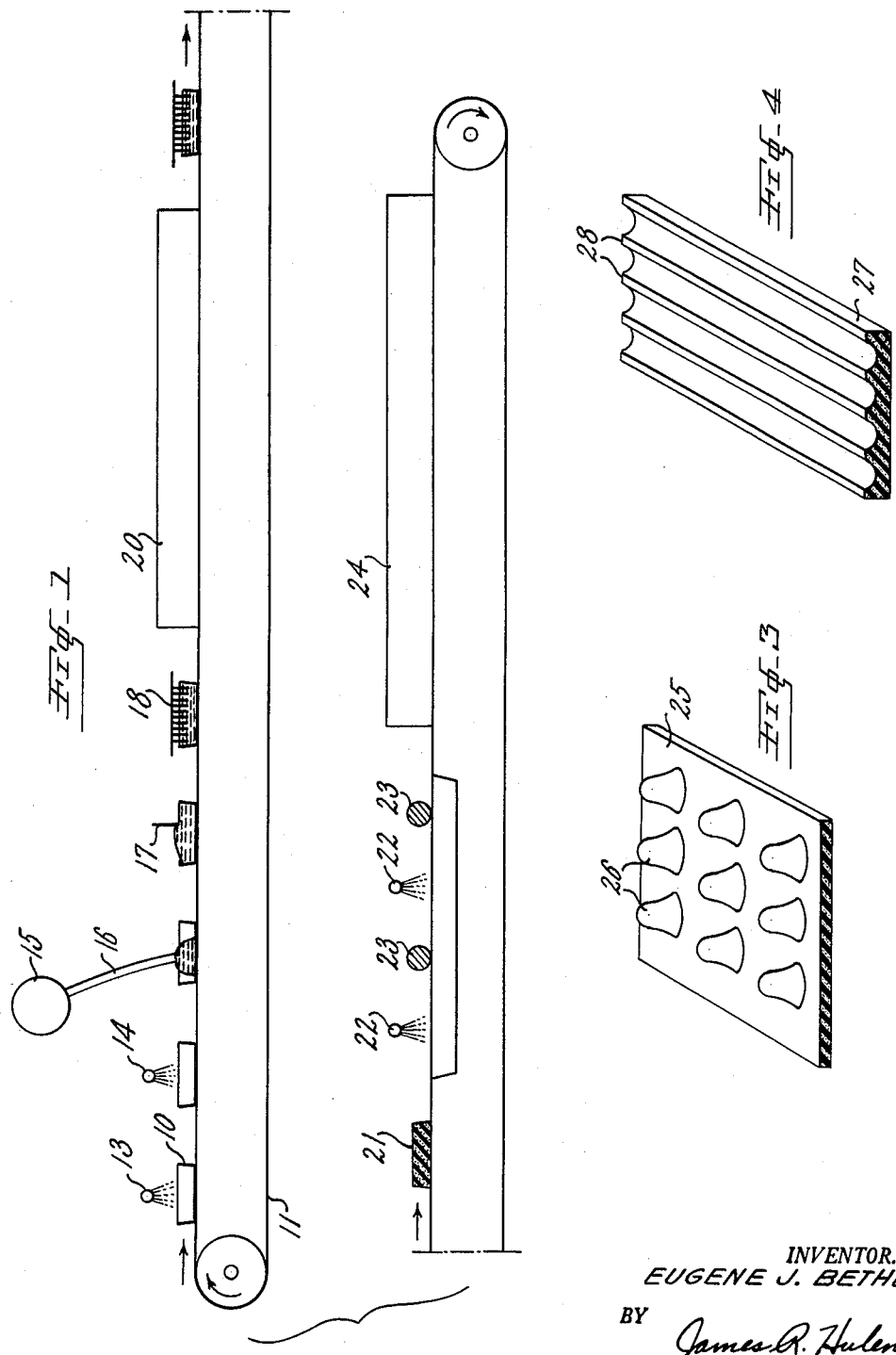
INVENTOR.
EUGENE J. BETHE
BY James R. Hulen
AGENT

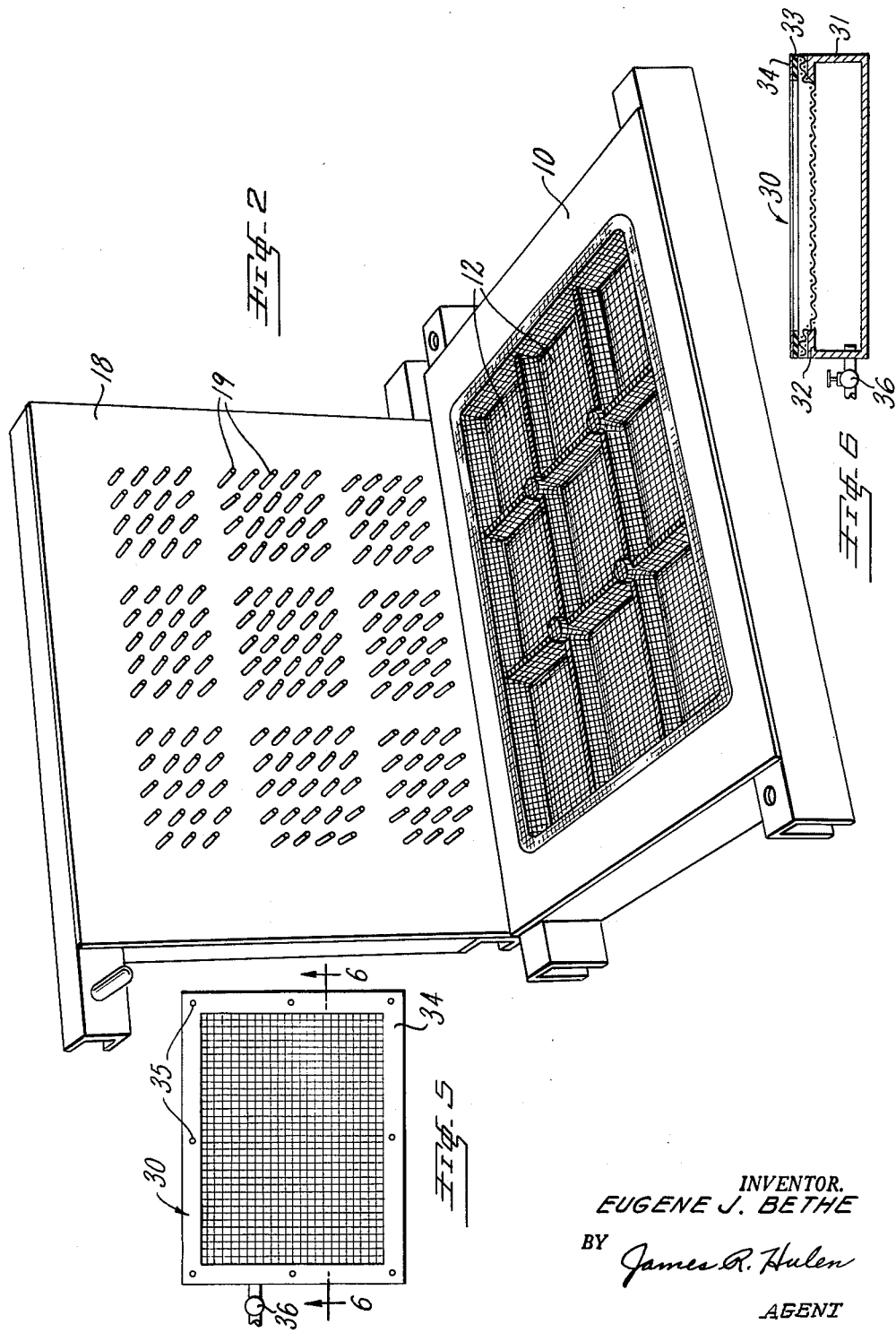

3,243,491
METHODS OF MAKING FOAM PRODUCTS
Eugene J. Bethe, Mishawaka, Ind., assignor to United States Rubber Company, New York, N.Y., a corporation of New Jersey
Filed Oct. 1, 1962, Ser. No. 227,245
11 Claims. (Cl. 264—330)

This invention relates to methods of making foam flatstock and also to methods of molding foam articles.

In present methods, latex foam flatstock is produced by pouring latex froth on a moving closed-surface conveyor belt, leveling the froth with a scraper or a doctor blade, gelling and curing the foam. The cured foam is then stripped from the belt, passed through a washer and finally dried. The finished stock is then put into sheets of desired size or rolls.

Continuous cored or contoured foam flatstock has long been a goal of the latex foam industry, but never has been successfully produced. The mechanics and cost of a cored or contoured spreader belt have always defeated any proposed scheme.

Molded foam articles are produced by the use of individual, closed surface metal molds. The molds are filled with a sensitized latex foam, a top plate is set and the latex foam allowed to gel. After curing in live steam, the foam articles are stripped from the mold, washed and dried.

Numerous disadvantages result from the use of a closed surface mold. Many of the foam units produced in prior conventional molds require repair because of air traps. Also, proper temperature control of closed surface molds in the factory is difficult to achieve. Too hot a mold results in a hide on the product; too cold a mold gives loose skin on the product. Proper mold conditioning requires a tremendous amount of space and capital expenditures.

A metal closed surface mold contains a considerable amount of metal. This mass of metal must be heated to 210–212° F. during cure and frequently air or water cooling is required before pouring again, resulting in a considerable power loss.

Since the latex foam is cast onto a closed surface foam carrier or into a closed surface mold, the curing step requires a great deal of time since the steam which is used to cure the foam must increase the mold temperature to 212° F. which then vaporizes the water in the latex foam to produce steam. This steam then permeates and cures the foam inside the closed mold. This, obviously, requires much time and expense.

Accordingly, an object of this invention is to provide a method of preparing latex foam which will eliminate any or all of the above disadvantages.

A further object of this invention is to provide a method of making continuous cored or contoured latex foam flatstock and continuous uncored flatstock.

A still further object of this invention is to provide a new and improved method for making molded latex foam material with a surface texture of pleasing design and hand.

In accordance with one embodiment of the invention, a porous molding surface is provided, a latex foam coagulant is applied to the porous surface, excess coagulant is removed from the interstices of the porous surface and latex froth is poured onto the surface and gels upon contact with the coagulant. The foam is then steam cured and stripped from the porous surface to form a molded latex foam article.

In another embodiment of the invention, a length of porous cellular foam material is cut so that one face thereof has a desired contour; the contoured material is made into an endless casting surface and supported by a porous carrier belt; latex foam coagulant and lubricant are applied to the contoured surface, excess coagulant is removed from the pores of the surface and latex froth is poured on the surface. The foam is cured and stripped from the surface forming cord or contoured latex foam flatstock.

In another embodiment the porous cellular foam material may be used as a casting surface without contouring the surface thereof to form flat or uncored flatstock.

The manner in which the invention realizes the foregoing and additional objects and advantages will be made manifest in the following detailed description, which is intended to be read with reference to the accompanying drawings, wherein:

FIG. 1 represents in purely diagrammatic fashion a longitudinal elevational view of an apparatus suitable for use in one embodiment of the invention;

FIG. 2 is a perspective view of a mold which is utilized in the FIG. 1 embodiment of this invention;

FIG. 3 represents a section of a cellular foam casting or forming surface having cores for making cored flatstock in accordance with one embodiment of the invention;

FIG. 4 represents a section of a cellular foam casting or forming surface for making contoured continuous flatstock;

FIG. 5 is a top plan view of a mold used in another embodiment of the present invention; and FIG. 6 is a sectional view taken along line 6—6 of FIG. 5.

A preferred embodiment of this invention is illustrated in FIGS. 1 and 2 of the drawings.

A mold 10 is placed on a conventional open-surface conveyor 11. Mold 10 is of special construction in that the mold cavities 12 are made of a porous material. Any porous material may be used for the mold but wire mesh or epoxy impregnated glass cloth are preferred. The mold cavities 12 may be formed in a die-forming operation or by any other conventional means. It is very important, however, that the interstices of the mesh material remain open.

The minimum mesh size of the porous mold has not been found to be critical, so long as the coagulant is removed from the interstices and the mold is air permeable. a mesh size greater than 6 x 6 per sq. inch has been found to be ineffective to prevent froth from flowing therethrough.

Mold 10 is moved by means of conveyor 11 under a coagulant spray 13. The purpose of the coagulant is to gel the foam upon contact, thus preventing the froth from striking through the interstices of the mold and to aid in stripping the foam from the mold surface.

Numerous foam coagulants have been used successfully on the porous mold surface. The presently preferred coagulant is an aqueous solution containing 5% zinc chloride when the natural rubber content of the foam is 50% or more.

A 5% sodium chloride solution is preferred if the natural rubber content of the latex is decreased. A mixture which has been found to be effective as a coagulant with any latex mixture is tetraethylene pentamine phosphate which is made in the following manner:

|  | Dry | Wet |
|---|---|---|
| 50% TEP | 1.880 | 3.760 |
| Water | ____ | 92.569 |
| 85% phosphoric acid | 3.120 | 3.671 |
|  | 5.000 | 100.000 |

Mix with stirring. Adjust pH to 4.5–5.0, if necessary, using either TEP or $H_3PO_4$.

Another mixture found to be effective as a coagulant with any latex mixture is 5% "Armosul" 16—a sulfopalmetic acid [$CH_3(CH_2)_{13}CH(SO_3H)COOH$] from Armour Chemical.

Other coagulants which have been effectively tested are mono, di, and trivalent metallic salts (sodium, zinc and aluminum), an acid (acetic), an acid salt (ammonium sulfate), an inorganic alkali (40% KOH), an organic alkali (octyl amine), a quaternary ammonium salt (Arquad 12), absorbents (Super Cel and Cato CWS), an acidic gas (carbon dioxide). In summary, virtually any material which will destabilize the latex froth can be used as an effective foam coagulant.

It will be obvious from the large number of coagulants listed above and from other possible coagulants that are not listed that different techniques are required to apply the desired coagulant to the mold surface. For example, the water soluble salts are employed as aqueous solutions having a concentration which may vary from 0.25% to saturated solutions. Octyl amine, a liquid, can be applied as such, or as an alcoholic solution. Potassium hydroxide, a strong inorganic alkali, is used as an aqueous solution. Since it coagulates the latex by "salting out" or "ionic shock," it must be concentrated (approximately 40%). Powdered absorbents such as Super Cel (diatomaceous earth) and Cato CWS (a cold water soluble starch) are used by dusting them on the inside surface of the mold.

Carbon dioxide, being a gas, requires a different technique. The porous mold is sealed into the top of a gas tight box. Carbon dioxide is gently fed into the box and forced upward through the pores of the mold. Using this procedure, foam can be made with a sodium silicofluoride sensitized froth or, if so desired, unsensitized froth can be employed and the carbon dioxide used as a coagulant and as the foam gellant.

After the coagulant is applied to the mold surface, mold 10 is subjected to a current of air from an air source 14. The advantage of blowing off mold 10 after spraying with coagulant is that the air removes excess coagulant and opens any interstices in the mold which are "windowed" by a film of coagulant. A windowed interstice will not vent trapped air. It will, of course, be unnecessary to provide an air source if the above described carbon dioxide or powdered absorbent coagulants are used since no windowing will occur to necessitate removal of coagulant from the interstices.

Mold 10 is filled with sensitized latex froth from frother 15 by way of delivery hose 16. Frother 15 may be an Oakes Frother or any other conventional type.

A typical frothed latex foam which may be employed in practicing the present invention may be obtained by suitably combining 35 parts by weight of a styrene-butadiene latex and 65 parts of a natural rubber latex with 2 parts sulfur, 0.90 part ethyl zimate, 1.1 part sinz salt of 2-mercaptobenzothiazole, 3 parts zinc oxide, 0.75 part amine stabilizer, and 0.75 part anti-oxidant. The above latex recipe is based on dry weights.

The froth will gel upon contact with the coagulant which has been applied to the mold surface.

Mold 10 is moved under a doctor blade or scraper 17 which levels the froth. In practice scraper 17 is manually moved evenly, smoothly, and without a sawing action across the top of the mold. The mold should also be scraped at a uniform speed, since variations in speed will vary the final thickness.

A top plate 18 having pins 19 may or may not be placed on the mold. If it is desired to obtain a cored product, top plate 18 is placed on mold 10 prior to curing. It is important that only the pins 19 contact the foam and that the top plate be held away from the surface of the foam. This construction allows ready access of the curing steam to the foam surface, and prevents the top plate from forcing the foam through the interstices of the porous mold 10. Good results have been obtained with and without top plate 18.

A cure oven 20 is filled with atmospheric steam (210–212° F.). Mold 10 is passed through oven 20 and because of the light porous nature of the mold, the cure time need be only 10 to 15 minutes. This compares with 25 to 30 minutes for conventional closed-surface molds. The open porous mold permits all sides of the latex foam to be exposed to the steam. After curing, the foam article is stripped from mold 10 as shown at 21, washed by water source 22, squeezed by wringer rolls 23 and dried in drying oven 24. The drying time may be 2 hours at 220° F.

This invention contemplates a further embodiment which is partially illustrated in FIGS. 3 and 4. This embodiment is similar to that described in FIGS. 1 and 2 except that the mold 10 is eliminated and the latex froth is cast directly onto a belt made of cellular foam. The belt may have a contoured casting surface or a flat casting surface.

An open cell foam material is utilized as a casting surface for manufacturing continuous latex foam flatstock. This casting surface permits the foam to be cured at accelerated rates because the curing element (steam) gains ready access to both surfaces of the latext foam layer. Further, the casting surface can be readily given surface design by contour cutting methods (sometimes called convolute cutting) and by hot wire techniques. A polyurethane cellular foam is preferred as a casting surface for this embodiment since it can be manufactured in virtually endless lengths and has physical properties to provide a useful operating life for the casting surface. The polyurethane foam can be passed through a convolute cutter and given a very wide range of surface configurations. The surface after passing through the convolute cutter would for example have the form of a corrugated surface in which the corrugates are straight or could have a corrugated surface in which the corrugates are wavy.

A convolute cutter has two rolls, vertically mounted with respect to one another, with inter-meshing designs on their surfaces. The designs may be flutes running the length of the rolls, cores, or any other desired configuration. The stock is passed through these configurated rolls and cut while in a compressed condition. Upon release of the rolls, the stock will have a cut surface design, the nature of which is dependent upon the type of configurated rolls used.

Two such configurations are illustrated in FIGS. 3 and 4. FIG. 3 illustrates a cellular material 25 which has upstanding cores 26 cut on the upper surface thereof. This cellular material may be made into a casting or forming surface or belt for producing continuous cored flatstock by mounting on a porous high strength carrier belt, such as an open wire mesh belt. FIG. 4 illustrates a cellular material 27 which is cut to produce corrugates 28 on the upper surface thereof. This material is used for making a belt for producing pipe filler stock.

The casting or forming surface produced by the above method, being rather soft, flexible cellular material, presents a surface from which the cured latex foam can easily be stripped if properly treated with coagulant and lubricant. The type of surface texture on a latex foam flatstock product can be varied considerably by using polyurethane foam having a wide variety of cell structure, or cell sizes, maximum of ⅛" diameter, as the belt. If a very fine texture (smooth surface) is desired on the final latex foam product, a very small cell polyurethane foam should be used as the casting surface. As in the case of the porous mesh mold surface, the minimum cell size is not critical so long as the casing surface is air permeable and the coagulant is removed from the cells.

In the practice of this embodiment, it has been found necessary to use a lubricant in addition to the coagulant for treating the cellular surface.

Lubricants can be any of the commonly used rubber lubricants, such as the Carbowaxes, the Ucons, silicones, mica, zinc stearate, etc.

Carbowax gives a soft, velvety feel to the foam but is hard to strip. Zinc chloride results in easy stripping of foam foam from urethane, but gives a harsh, hidey surface. Mixtures of the two gives stripping with fair hand and minimum hide. Many possibilities exist for better lubricant-coagulant baths.

Merely for purposes of illustration, a urethane foam designed for use according to the present invention may be formed as follows: A polymer having reactive isocyanate groups is made by reacting toluene diisocyanate (30%, 2,4 and 20% 2,6 isomer mixture) with a polyol prepared by condensing propylene oxide onto trimethyl propane to an approximate molecular weight of 4,000. The toluene diisocyanate is reacted with the polyol of an equivalent ratio of 5.3 equivalents of toluene diisocyanate per equivalent of polyol. This diisocyanate-polyol reaction product, which may be referred to as the prepolymer, is stabilized for foaming by the addition of 4 parts of a suitable silicone oil, e.g. an organic modified polysiloxane produced by Union Carbide Corporation under the designation L–520, per 100 parts of polyol. After stabilization, the prepolymer is foamed by adding to 100 parts thereof 5 parts of trichloromonofluoromethane, 5 parts of toluene diisocyanate, and 5 parts of didecylphthalate. This masterbatch is fed as a separate stream into a mixing head where it is mixed with a catalyst-water mixture comprising 0.5 part triethylamine, 1.0 part stannous octoate, 1.0 part N-ethylmorpholine, and 2.8 parts water. The resultant foaming mixture is that which is poured into the mold.

Other foam materials such as latex or vinyl might be used as a casting surface with this embodiment of the invention although polyurethane would be the best because of its high tensile and elongation, fine structure and low cost. Polyurethane foam also performs well in a contour cutter.

Modifications can be made if only part of the advantages of this invention are desired. For example, regular foam flatstock could be poured on a smooth surfaced open celled polyurethane foam sheet. The finished foam flatstock would not be cored or contoured, but it could be given a rapid cure by subjecting the latex foam to an atmosphere of steam. Likewise, foam could be poured on a contour cut, non-porous foam surface (silicone sponge). The resulting stock would be cored, but only the upper surface of the foam would be exposed to the steam for curing purposes. Furthermore, a flat or cored carrier belt could be made of any of the materials which are suitable for mold 10 in the FIG. 1 embodiment of this invention. For example, a flat belt could be made of a wire mesh and the latex froth cast directly upon the carrier belt.

From the foregoing it will be apparent that the invention affords a convenient and economical method for making molded foam articles, cored or contoured foam flatstock, and foam flatstock.

The preferred apparatus for utilizing a gaseous foam coagulant is illustrated in FIGS. 5 and 6. A porous mold 30, which may be constructed of similar materials and in a manner similar to mold 10, is sealed into the top of gas tight box 31. Mold 30 is secured around its peripheral edge to an inwardly directed flange 32 on box 31 by a suitable sealing gasket 33 and metal clamping rim 34. Screws 35, or other means, may be used to secure rim 34 to box 31. Carbon dioxide, or another foam coagulating gas, may be fed gently into box 31 through valve 36 from a gas source (not shown) and forced upwardly through the pores of mold 30. With mold 30 thus prepared, the molding operation may proceed in a manner similar to that hereinabove described in the description of mold 10.

The curing of the foam in mold 30 may be carried out in a conventional manner by passing the mold through a curing oven or, alternatively, box 31 may be equipped with a steam inlet for feeding steam to the interior of the box to thereby cure the foam rapidly from both sides. In either case, the resulting foam product will have a surface texture superior to foam products made in conventional closed molds.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. A method of making foam products on a porous surface having interstices of sufficient size that latex froth would ordinarily pass therethrough, comprising the steps of: applying foam coagulant to said surface without blocking the interstices thereof; and pouring latex froth upon said surface; whereby, the froth that contacts said coagulant rapidly gels to prevent passage of said latex froth through said interstices.

2. A method of making foam products on a porous surface having interstices of sufficient size that latex froth would ordinarily pass therethrough, comprising the steps of: applying foam coagulant to said surface without blocking the interstices thereof; and pouring latex froth upon said surface; whereby, the froth that contacts said coagulant rapidly gels to prevent passage of said latex froth through said interstices; and curing said froth.

3. The method of claim 2, further comprising the step of stripping the cured foam from said surface.

4. A method of making foam products on a porous surface having interstices of sufficient size that latex froth would ordinarily pass therethrough, comprising the steps of: applying a liquid foam coagulant to said surface; removing excess coagulant from said interstices to open said interstices; covering said surface with latex froth; whereby, the froth that contacts said coagulant rapidly gels to prevent passage of said latex froth through said interstices; and curing said froth.

5. A method of making foam products on a porous surface having interstices of sufficient size that latex froth would ordinarly pass therethrough, comprising the steps of: applying a solid foam coagulant to said surface; removing excess coagulant from said interstices to open said interstices; covering said surface with latex froth; whereby, the froth that contacts said coagulant rapidly gels to prevent passage of said latex froth through said interstices; and curing said froth.

6. A method of molding latex foam in an open mesh mold having interstices of sufficient size that latex froth would ordinarily pass therethrough, comprising the steps of: applying foam coagulant to the surface of said mold without blocking the interstices thereof; filling said mold with latex froth; gelling said froth by contact with said coagulant; whereby, said froth is prevented from passing through said interstices; and curing said froth.

7. A method of molding latex foam in an open mesh mold having interstices of sufficient size that latex froth would ordinarily pass therethrough, comprising the steps of: applying a liquid foam coagulant to the surface of said mold; removing excess coagulant from the interstices of said mesh mold to open said interstices; filling said mold with latex froth; gelling said froth by contact with said coagulant; whereby said froth is prevented from passing through said interstices; and curing said froth.

8. A method of molding latex foam in an open mesh mold having interstices of sufficient size that latex froth would ordinarily pass therethrough, comprisnng the steps of: applying a solid foam coagulant to the surface of said mold; removing excess coagulant from said interstices to open said interstices; filling said mold with latex froth; gelling said froth by contact with said coagulant; whereby said froth is prevented from passing through said interstices; and curing said froth.

9. A method of making foam products on a porous surface having interstices of sufficient size that latex froth would ordinarily pass therethrough, comprising the steps of: applying a foam coagulant to said surface by exposing said surface to an atmosphere of gaseous foam coagulant; and pouring latex froth upon said surface; whereby, the froth that contacts said coagulant rapidly gels to prevent passage of said latex froth through said interstices.

10. The method of claim 9 wherein said coagulant is carbon dioxide.

11. A method of making latex foam flatstock on the surface of a porous carrier, said surface having interstices of sufficient size that latex froth would ordinarily pass therethrough, comprising the steps of: applying foam coagulant to said surface without blocking the interstices thereof; covering said surface with latex froth; whereby, the froth that contacts said coagulant rapidly gels to prevent passage of said latex froth through said interstices; and curing said froth with steam; whereby, the porosity of said carrier is utilized to expose the froth to steam for a rapid curing.

References Cited by the Examiner

UNITED STATES PATENTS

| | | | |
|---|---|---|---|
| 1,945,256 | 1/1934 | Clarke | 264—82 |
| 1,948,989 | 2/1934 | McEwan. | |
| 1,969,275 | 8/1934 | Ogilby | 264—306 |
| 2,132,502 | 10/1938 | Watkins | 264—304 |
| 2,227,809 | 1/1941 | Greenup et al. | 264—330 |
| 2,595,964 | 5/1952 | Lovell | 264—330 |
| 2,604,664 | 7/1952 | Jordon | 264—331 |
| 2,707,801 | 5/1955 | Gard | 18—47 XR |
| 3,608,523 | 12/1962 | Adinoff et al. | 264—50 XR |
| 3,076,226 | 2/1963 | Borton et al. | 264—48 XR |
| 3,081,496 | 3/1963 | Moore | 264—50 XR |
| 3,136,832 | 6/1964 | Ballmer | 264—45 XR |

FOREIGN PATENTS 210,992  4/1956  Australia.

ALEXANDER H. BRODMERKEL, *Primary Examiner.*

MORRIS LIEBMAN, *Examiner.*